United States Patent [19]
Akita et al.

[11] Patent Number: 6,032,730
[45] Date of Patent: Mar. 7, 2000

[54] HEAT EXCHANGER AND METHOD OF MANUFACTURING A HEAT EXCHANGING MEMBER OF A HEAT EXCHANGER

[75] Inventors: Hiroyuki Akita; Hidemoto Arai; Akira Doi; Yoichi Sugiyama; Shinji Nakamoto; Kunihiko Kaga, all of Tokyo, Japan

[73] Assignee: Mitsubishi Denki Kabushiki Kaisha, Tokyo, Japan

[21] Appl. No.: 08/925,465

[22] Filed: Sep. 8, 1997

[30] Foreign Application Priority Data

Sep. 12, 1996 [JP] Japan .................................. 8-241990

[51] Int. Cl.⁷ ......................................................... F28F 3/00
[52] U.S. Cl. ........................... 165/166; 165/167; 165/170; 165/157; 29/890.03; 29/890.052; 29/890.039
[58] Field of Search ..................... 165/166, 167, 165/170, 157, 54; 29/890.03, 890.052, 890.039, 890.038

[56] References Cited

U.S. PATENT DOCUMENTS

| | | | |
|---|---|---|---|
| 2,812,165 | 11/1957 | Hammond | 165/166 |
| 2,959,400 | 11/1960 | Simpelaar | 165/166 |
| 2,988,033 | 6/1961 | Gapp | 111/118 |
| 3,291,206 | 12/1966 | Nicholson | 165/166 |
| 3,613,782 | 10/1971 | Mason et al. | 165/166 |
| 3,759,323 | 9/1973 | Dawson et al. | 165/166 |
| 4,022,050 | 5/1977 | Davis et al. | 165/170 |
| 4,352,393 | 10/1982 | Vidal-Meza | 165/166 |
| 4,378,837 | 4/1983 | Ospelt | 165/166 |
| 4,384,611 | 5/1983 | Fung | 165/166 |
| 4,460,388 | 7/1984 | Fukami et al. | 165/166 |
| 4,616,695 | 10/1986 | Takahashi et al. | 165/166 |
| 5,216,580 | 6/1993 | Davidson et al. | 165/104.33 |

FOREIGN PATENT DOCUMENTS

| | | | |
|---|---|---|---|
| 336-407 | 10/1989 | European Pat. Off. | 165/166 |
| 0 777 094 | 6/1997 | European Pat. Off. | |
| 29315 | 4/1924 | France | 165/166 |
| 56-25696 | 12/1981 | Japan | |
| 57-122289 | 7/1982 | Japan | |
| 58-95 | 1/1983 | Japan | 165/166 |
| 58-156190 | 9/1983 | Japan | 165/166 |
| 59-24195 | 2/1984 | Japan | 165/166 |
| 60-2888 | 1/1985 | Japan | 165/166 |
| 62-136787 | 8/1987 | Japan | |
| 63-29195 | 2/1988 | Japan | 165/166 |
| 313144 | 6/1929 | United Kingdom | 165/166 |
| 316718 | 8/1929 | United Kingdom | 165/166 |
| 2 171 507 | 8/1986 | United Kingdom | |
| 8607133 | 12/1986 | WIPO | 165/166 |
| WO 95/09338 | 4/1995 | WIPO | |

*Primary Examiner*—Ira S. Lazarus
*Assistant Examiner*—Terrell McKinnon
*Attorney, Agent, or Firm*—Burns, Doane, Swecker & Mathis, LLP

[57] ABSTRACT

A heat exchanger, in which an alternating flow of supply air and exhaust air are supplied in opposite directions between a plurality of stacked heat exchanging members, is characterized in that the heat exchanging members each is composed of a first paper member having a moisture permeability and corrugated in the width direction and having flat portions at the longitudinally opposite ends flattened under pressure, and a pair of second paper members having one end joined to the flat portions and the other end side extending flatly in the longitudinal direction to define a header defining portion for defining a header portion, so that the number of the parts can be decreased and the assembly can be made easier, whereby a heat exchanger with an improved productivity can be provided. A method for manufacturing a heat exchanger is also disclosed.

15 Claims, 16 Drawing Sheets

HEAT EXCHANGER AND METHOD OF MANUFACTURING A HEAT EXCHANGING MEMBER OF A HEAT EXCHANGER

BACKGROUND OF THE INVENTION

This invention relates to a total heat exchanger of the opposed flow type for use in heat exchanging ventilation apparatus or air conditioners for example and, more particularly, to a structure and manufacturing method of a heat exchanging member interposed between a supply air and an exhaust air.

In recent years, the importance of the ventilation has been being reevaluated as the thermal insulation and hermetic seal of a living space is strengthened in order to improve the heating and cooling effect. In order to achieve ventilation without damaging the heating and cooling effect, the heat exchange between the polluted indoor air and fresh outdoor supply air is effective. At this time, a significant effect could be expected if the exchange can be achieved not only in heat (sensible heat) but also in moisture (latent heat). In order to satisfy such the requirements, the opposed flow type total heat exchanger is used in which supply air and exhaust air flow in the opposite directions in the heat exchanging portion in order to improve the heat exchanging efficiency and a paper member having a moisture permeability is used as the heat exchanging member.

FIG. 29 is a perspective view illustrating a general structure of a conventional opposed flow type total heat changer disclosed in Japanese Utility Model Laid-Open No. 62-136787 for example, FIG. 30 is a perspective view showing the structure of a heat exchanging member constituting a main portion of the opposed flow type total heat exchanger shown in FIG. 29, FIG. 31 is an expanded perspective view showing the heat exchanging member shown in FIG. 30 and FIG. 32 is a perspective view showing the procedures for assembling a joint portion between the opposed flow portion and the header portion of the heat exchanging member shown in FIG. 30.

In the figures, 1 are heat exchanging members stacked as shown in FIG. 29, each of the heat exchanging members 1 is composed of a first paper member 2 corrugated in the widthwise direction and having a permeability to moisture, a pair of second paper members 3 and 4 of flat plate-shape and having one end joined to a substantially middle height portion of the corrugation of the longitudinal ends of the first paper member 2, and a plurality of closure members 5 joined so as to close triangular window portions defined in the waveform portion of the first paper member 2 by second paper members 3 and 4, 6 is a first seal member for alternatingly sealing the neighboring end portions of the second paper members 3 and 4 of the stacked heat exchanger member 1, 7 is a second sealing member for sealing the neighbouring end portions of the second paper members 3 and 4 alternatingly to the first sealing member 6, and 8 is a third sealing member for entirely covering and sealing the opposite end portions of each of the first paper members 2.

According to the conventional opposed flow type total heat exchanger as discussed above, a number of heat exchanging flow paths are defined between the first paper members 2 of the heat exchanging member 1, and one end of each of these heat exchanging flow paths is in communication with the portion of the end of the second paper members 3 and 4 that is not sealed by the first sealing member 6 and the other end of each of the heat exchanging flow paths is alternatingly communicated with the portion of the end of the second paper members 3 and 4 that is not sealed by the second sealing member 7.

Also, the supply air (shown by an arrow a in FIG. 29) and the exhaust air (shown by an arrow b in FIG. 29) supplied from the end portions of the second paper members 3 and 4 are exchanged with each other in terms of heat and moisture, i.e., exchanged in terms of total heat as they flow in alternatingly opposite directions through the heat exchanging flow paths defined between the first paper members 2 and then discharged from the side portions of the second paper members 4 and 3 (as shown by arrows c and d in FIG. 29).

In the conventional opposed flow type total heat exchanger, it is necessary to enable the heat exchanging member 1 to exchange also in moisture as discussed above, so that, as disclosed in Japanese Patnet Laid-Open Nos. 57-122289 and 59-24195 for example, it has not been possible to prepare the heat exchanging member by utilizing the plastic deformation such as the vacuum forming of a plastic sheet material or the press forming of a thin metal sheet, and they must be formed by the paper members 2, 3 and 4 as well as the closure members 5 which are impossible to be plastically deformed, disadvantageously resulting in a very poor productibility due to the difficulties in handling and joining the parts that are large in number and small in dimension particularly in the closure members 5.

SUMMARY OF THE INVENTION

Accordingly one object of this invention is to provide a heat exchanger free from the above-discussed problems.

Another object of the present invention is to provide a heat exchanger with a decreased number of parts to make the assembly easy to improve the productivity.

Another object of the present invention is to provide an easy and efficient method for manufacturing a heat exchanging member for a heat exchanger.

With the above objects in view, the heat exchanger according to one embodiment of the present invention in which an alternating flow of supply air and exhaust air are supplied in opposite directions between a plurality of stacked heat exchanging members is characterized in that the heat exchanging members each is composed of a first paper member having a moisture permeability and corrugated in the width direction and having flat portions at the longitudinally opposite ends flattened under pressure, and a pair of second paper members having one end joined to the flat portions and the other end side extending flatly in the longitudinal direction to define a header defining portion for defining a header portion.

According to one embodiment of the heat exchanger of the present invention, an alternating flow of supply air and exhaust air are supplied in opposite directions between a plurality of stacked heat exchanging members and the heat exchanging members each is composed of a first paper member having a moisture permeability and corrugated in the width direction and having flat portions at the longitudinally opposite ends flattened under pressure, and a pair of second paper members having one end joined to the flat portions and the other end side extending flatly in the longitudinal direction to define a header defining portion for defining a header portion, and that a flat plate-like partitioning paper member is interposed between the heat exchanging members.

According to one embodiment of the heat exchanger of the present invention, the second paper members has thermal adhesion property.

According to one embodiment of the heat exchanger of the present invention, an alternating flow of supply air and exhaust air are supplied in opposite directions between a plurality of stacked heat exchanging members, and the heat exchanging members each is composed of a paper member having a moisture permeability and corrugated in the width direction and a header defining portion for defining a header portion by a flattened portions at the longitudinally opposite ends flattened under pressure over a predetermined length.

According to one embodiment of the heat exchanger of the present invention, an alternating flow of supply air and exhaust air are supplied in opposite directions between a plurality of stacked heat exchanging members, and the heat exchanging members each is composed of a paper member having a moisture permeability and corrugated in the width direction and a header defining portion for defining a header portion by a flattened portions at the longitudinally opposite ends flattened under pressure over a predetermined length and that a flat plate-like partitioning paper member is interposed between the heat exchanging members.

According to one embodiment of the heat exchanger of the present invention, the header defining portion is held by a shape holding member.

According to one embodiment of the heat exchanger of the present invention, the paper members has thermal bonding property.

According to one embodiment of the heat exchanger of the present invention, the paper containing chemical fibers is used.

According to one embodiment of the heat exchanger of the present invention, the header portion is formed by sealing the end portions of neighbouring header defining portions by a thermoplastic material with a predetermined clearance held therebetween.

According to one embodiment of the heat exchanger of the present invention, the header portion is formed by folding at least one of the end portions of neighbouring header defining portions and stacking over the other end portion to seal therebetween.

According to one embodiment of the heat exchanger of the present invention, the end portion of the header defining portion is folded such that it is sloped along the direction of flows of intake air and exhaust air.

According to one embodiment of the heat exchanger of the present invention, the contacting portion of the opposite flow portion of the heat exchanging member and the partition paper member is joined together except for one portion.

According to one embodiment of the heat exchanger of the present invention, the circumference of the opposite flow portion of the stacked heat exchanging members is wound with an adhesive tape.

A method for manufacturing a heat exchanger according to one embodiment comprises the steps of forming widthwise corrugations in a first paper member having a moisture permeability, overlapping end portions of a pair of flat plate like second paper members on a longitudinally opposite ends of the first paper member, and pressing the overlapped end portions of the first and second paper members together to join the end portions of the paper members together and to flatten the pressed portions to define a header defining portion.

The method for manufacturing a heat exchanger according to one embodiment comprises the steps of forming widthwise corrugations in a paper member having a moisture permeability, and pressing a longitudinally opposite end portions of the paper members together to flatten a predetermined region to define a header defining portion.

The method for manufacturing a heat exchanger according to one embodiment comprises the steps of simultaneously forming a first corrugated portion having widthwise corrugations of a predetermined size for heat exchanging flow paths in a longitudinally central portion of a paper member having a moisture permeability and a second corrugated portion having widthwise corrugations smaller than the first corrugated portion in a longitudinally opposite end portions of the paper member.

The method for manufacturing a heat exchanger according to one embodiment comprises the steps of forming a first corrugated portion having widthwise small corrugations in a paper member having a moisture permeability, and forming a second corrugated portion for heat exchanging flow paths and having a predetermined size larger than the first corrugated portion.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
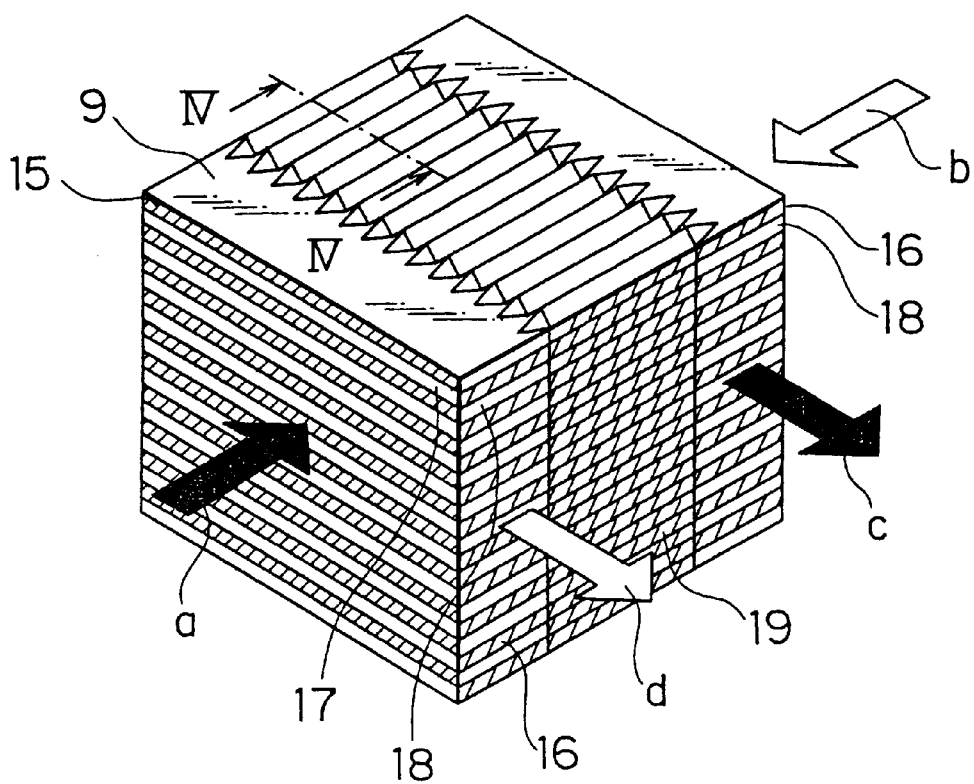
FIG. 1 is a perspective view showing a schematic structure of the opposed flow type total heat exchanger of the first embodiment of the present invention.
Figure 2:
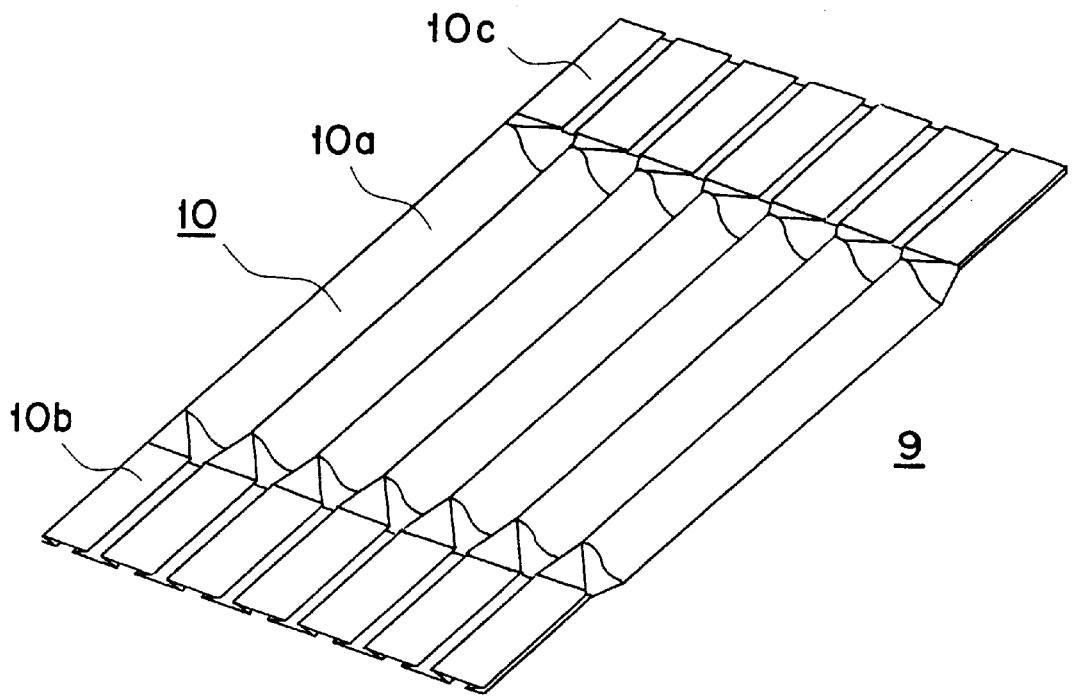
FIG. 2 is a perspective view showing the structure of the heat exchanging member of the opposed flow type total heat exchanger shown in FIG. 1.
Figure 3:
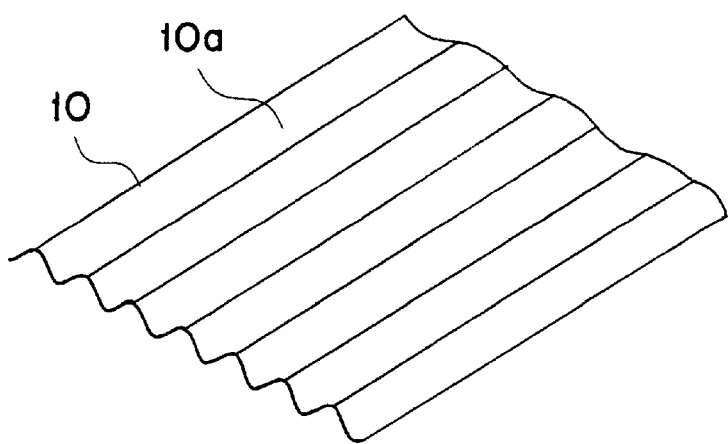
FIG. 3 is a perspective view showing the details of the main portion of the heat exchanging member shown in FIG. 2.
Figure 4:
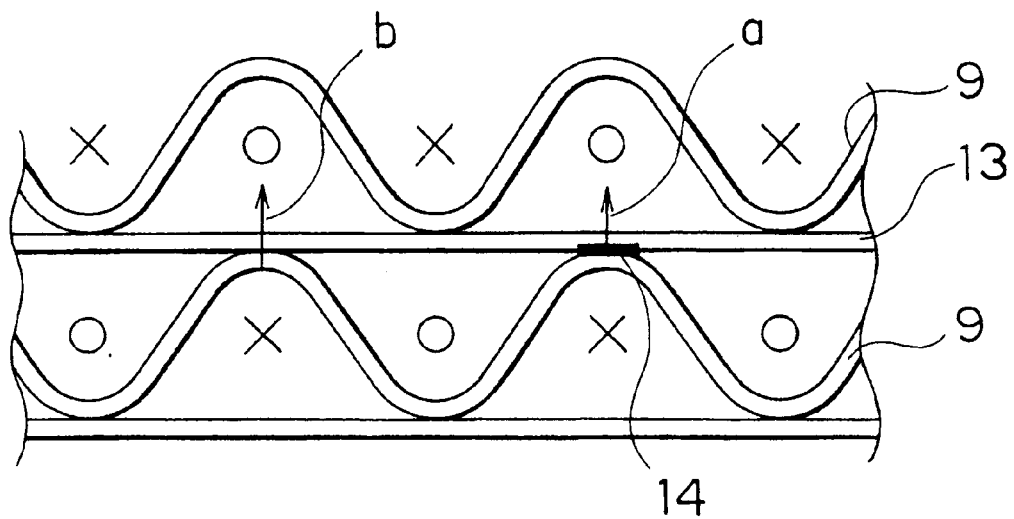
FIG. 4 is a sectional view showing the cross section taken along line IV—IV of FIG. 1.
Figure 5:
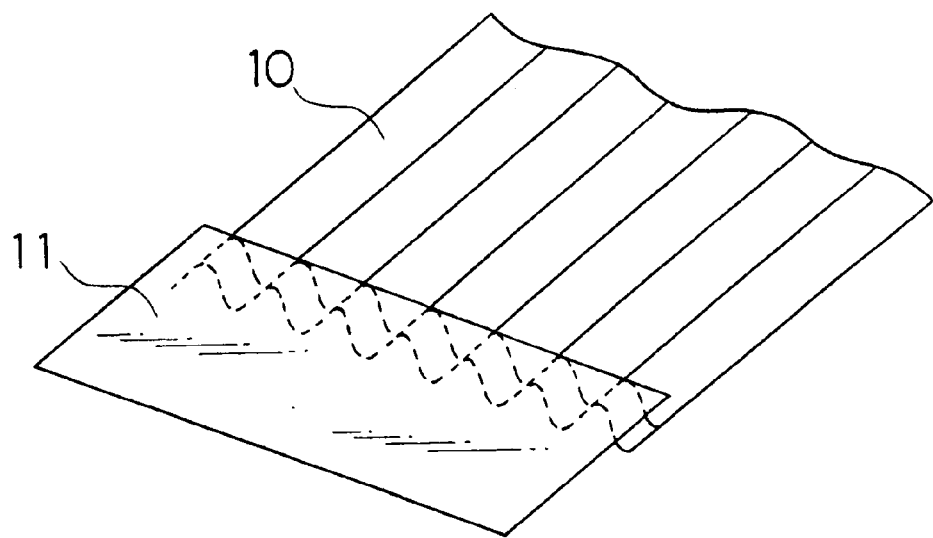
FIG. 5 is a perspective view showing a step of manufacturing the heat exchanging member shown in FIG. 2.
Figure 6:
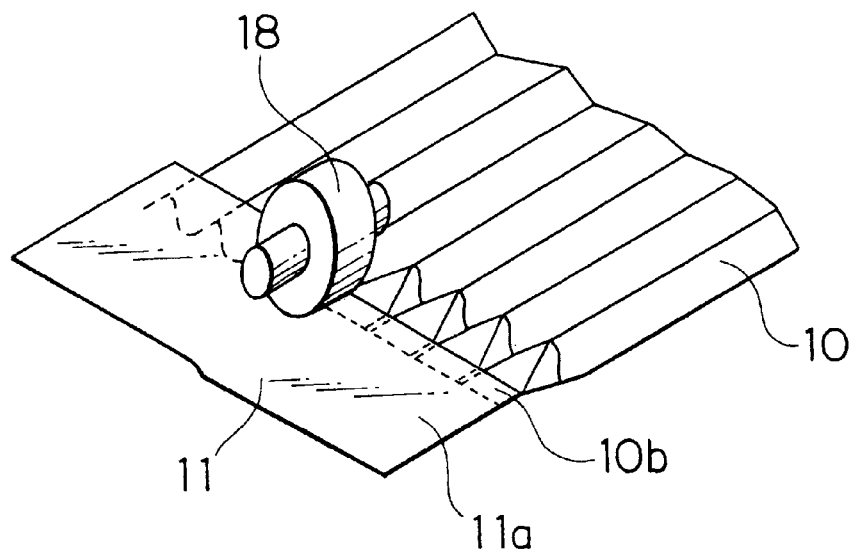
FIG. 6 is a perspective view showing another step different to that of FIG. 5 of manufacturing the heat exchanging member shown in FIG. 2.
Figure 7:
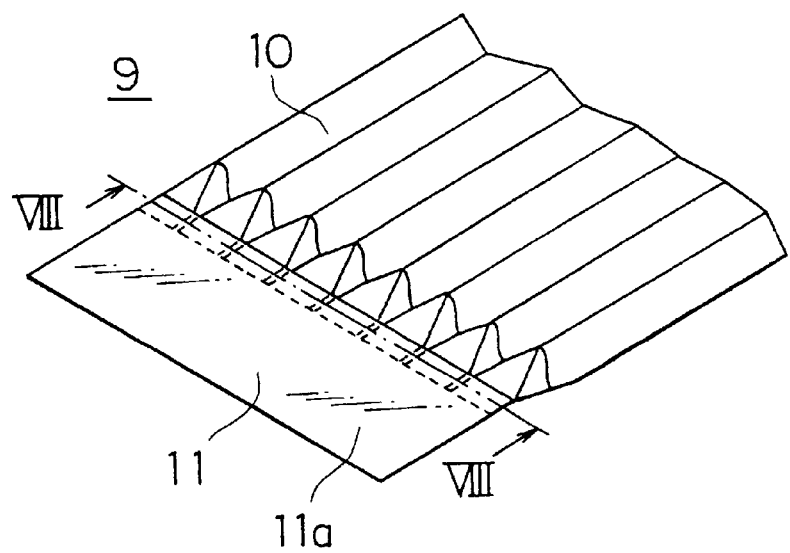
FIG. 7 is a persective view showing still another step different to that of FIG. 5 of manufacturing the heat exchanging member shown in FIG. 2.
Figure 8:
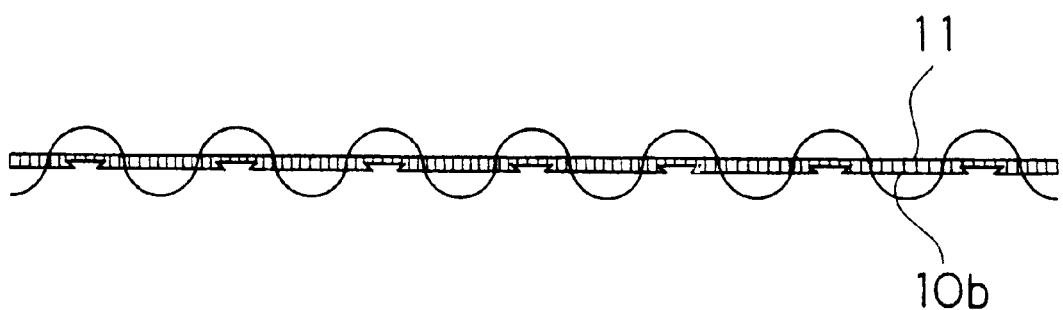
FIG. 8 is a diagrammatic sectional view showing the cross section taken along line VIII—VIII of FIG. 7.

FIG. 1 is a perspective view showing a schematic structure of the opposed flow type total heat exchanger of the first embodiment of the present invention, FIG. 2 is a perspective view showing the structure of the heat exchanging member of the opposed flow type total heat exhchanger shown in FIG. 1, FIG. 3 is a perspective view showing the details of the main portion of the heat exchanging member shown in FIG. 2, FIG. 4 is a sectional view showing the cross section taken along line IV—IV of FIG. 1, FIGS. 5 to 7 are perspective view showing the steps of manufacturing the heat exchanging member shown in FIG. 2 and FIG. 8 is a diagramatic sectional view showing the cross section taken along line VIII—VIII of FIG. 7.

In the figures, 9 are heat exchanging members placed one over another in a stack, each of the heat exhanging members 9 is, as shown in FIGS. 2 and 3, composed of a first paper member 10 having a permeability to moisture and having formed therein a corrugated portion 10a of a predetermined dimension in the widthwise direction and having formed therein press-crashed flat portions 10b and 10c at the longitudinally opposite ends, and a pair of second paper members 11 and 12 (only the second paper member 11 is shown) having one end overlapped and joined to the flat portions 10b and 10c of the first paper member 10 and having the other end extending in a longitudinal direction to define header defining portions 11a and 12a defining header portions which will be described later, and the heat exchanging members 9 are stacked and bonded by a bonding agent 14 for example with a plate-like partition paper member 13 having a permeability to moisture interposed therebetween as shown in FIG. 4. In FIG. 4, ○ and x are supply air and exhaust air, respectively.

15 are first seal members each for alternatingly sealing between the neighboring end portions of the header defining portions 11a and 12a of the second paper members 11 and 12 of each of the heat exchanging members 9, 16 are second seal members each for alternatingly sealing between the neighbouring end portions of the header defining portions 11a and 12a of the second paper members 11 and 12 but in a staggered relationship with respect to the first seal members 15, the second seal members 16 defining header portions 17 and 18 in cooperation with the respective header defining portions 11a and 12a and the first seal members 15. 19 are third seal members for entirely covering and sealing the opposite side portions of the first paper members 10.

Then, a manufacturing method for the heat exchanging member 9 of the opposed flow type total heat exchanger of the first embodiment having the above described structure will now be described in conjunction with FIGS. 5 to 7.

First, the corrugated portion 10a having corrugations of a predetermined dimension which define the heat exchanging flow paths is formed in the width wise direction of the first paper member 10 having a permeability to moisture, and one end portion of the pair of plate-like second paper members 11 and 12 are superposed on the longitudinal opposite end portions of the first paper member 10 as shown in FIG. 5 (only the second paper member 11 is shown). At this time, a bonding agent (not shown) such as Hot Melt resin or the like is applied on the surface of the side corresponding to the second paper members 11 and 12 of the opposite end portions of the first paper member 10.

Then, as shown in FIG. 6, the superposed portions of the paper members 10, 11 and 12 are pressed to be flattened by a roller 18, and the flat portions 10b and 10c formed by this step at the opposite end portions of the first paper member 10 is bonded to the end portion of the second paper members 11 and 12, whereby the header defining portions 11a and 12a are formed in the second paper members 11 and 12 to obtain the heat exchanging member 9 as shown in FIG. 7. It is to be noted that the flat portions 10b and 10c of the first paper member 10 are pressed to be flattened as shown in the section in FIG. 8 and their shape is maintained by the bonding agent applied to their surface. At this time, the flat portions 10b and 10c may be located substantially at the center of the size of the corrugations or the height of the corrugations of the corrugated portion 10a so that the uniform heat exchanging flow paths may be defined on both the obverse and reverse side of the member, allowing the heat exchanger to be operated without decreasing the efficiency and without much loss.

In the opposed flow type total heat exchanger of the first embodiment of the present invention having the structure as above described, a large number of heat exchanging flow paths are defined between the heat exchanging members 9 stacked with the partition paper members 13 inserted therebetween, so that the heat exchanging flow path defined in the first stage is at one end thereof in communication with the header portion 17 which opens in the direction shown by the arrow b of FIG. 1 and at the other end thereof in communication with the header portion 18 which opens in the direction shown by the arrow d of the figure, and that the heat exchanging flow path defined in the second stage is at one end thereof in communication with the header portion 17 which opens in the direction shown by the arrow a of FIG. 1 and at the other end thereof in communication with the header portion 18 which opens in the direction shown by the arrow c of the figure, and all other heat exchanging flow paths are arranged to repeat the above-described structure successively and alternatingly. The supply air supplied from the direction of the arrow a in the figure through the header portions 17 and the exhaust air discharged through the header portions 17 in the direction of the arrow b in the figure are arranged to flow in alternatingly opposite directions through each of the heat exchanging flow path, allowing the heat and moisture exchange or the total heat exchange to be achieved and the air is discharged from the header portions 18 and 18 in the directions shown by the arrows c and d.

Thus, according to the first embodiment of the invention, the heat exchanging member 9 are constructed such that the flat portions 10b and 10c are formed by pressing to flatten corrugated portion 10a having widthwise corrugations of a predetermined dimension for defining the heat exchanging flow paths in the first paper member 10 having a permeability to moisture, and these flat portions 10b and 10c are overlapped and joined to form a unitary structure with one end of the plate-like second paper members 11 and 12 to define the header defining portions 11a and 12a, so that the number of the parts can be decreased and the assembly can be made easier, allowing the improvements in the productivity.

Also, as for the second paper members 11 and 12, a heat weldable material, such as a paper in which heat weldable chemical fibers such as polyethylene or polyethylene terephtalate are completely or partly mixed into pulp fibers, or a sheet in which a base of pulp fibers is completely or partly coated with a heat weldable adhesive such as Hot Melt or acetic acid vinyl, may be used. In this case, a bonding agent or another shape maintaining means for maintaining the flattened shape of the flat portions 10b and 10c that are made by pressing the corrugated portion 10a is not necessary, so that the process for maintaining the shape or for applying a bonding agent may be eliminated, resulting in further improvements in productivity.

Further, when a paper containing chemical fibers is used as heat weldable paper, the chemical fibers melt due to the heat while the flat portions 10b and 10c are being formed and the density of the paper sheet itself increases to allow the thickness of the flat portions 10b and 10c to be small, so that the flow paths can relatively be expanded to decrease the flow resistance in the flow paths, resulting in a heat exchanger of a low pressure loss.

Further, while each of the heat exchanging members 9 and the partition paper members 13 between them are joined by the bonding agent 14 as shown in FIG. 4 in the above structure, at least one portion of the joint portion may be left free from the application of the bonding agent 14. Then, since the moisture passes much easier through the portion in which the heat exchanging member 9 and the partition paper member 13 directly contact each other as shown by the arrows b than through the portion in which the bonding agent 14 is interposed as shown by the arrow a, allowing the provision of a heat exchanger of a higher efficiency in moisture exchange.

Figure 9:
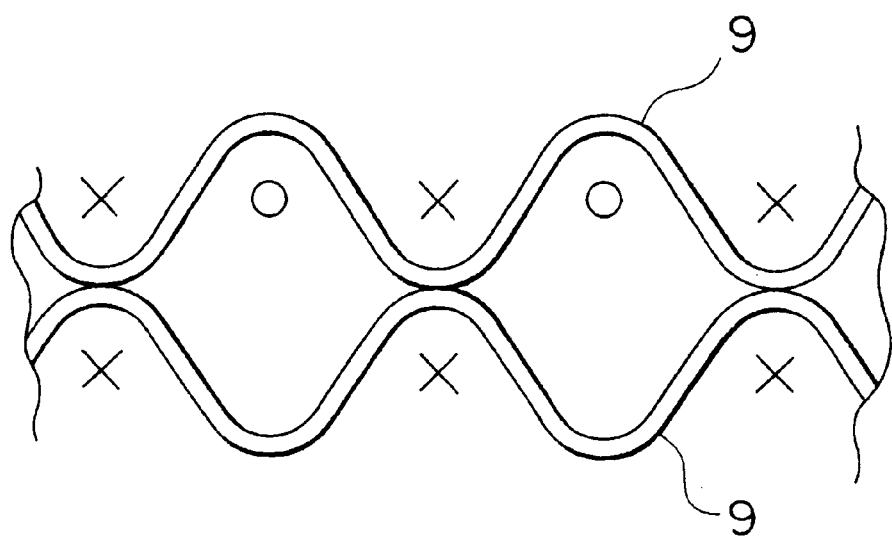
FIG. 9 is a sectional view showing an example of the stack structure different from FIG. 4.

While the description has been made in terms of the structure in which the partition paper member 13 is inserted between the heat exchanging members 9 in the above description, the corrugated portions 10a of each of the heat exchanging members 9 may be directly brought into contact to define the heat exchanging flow paths as shown in FIG. 9. Also, while the description has been made as to the pressing by the roller 18 of the overlapped portions of the paper members 10, 11 and 12, they may be pressed flat by the pressing machine or the like to obtain similar advantageous results.

Figure 10:
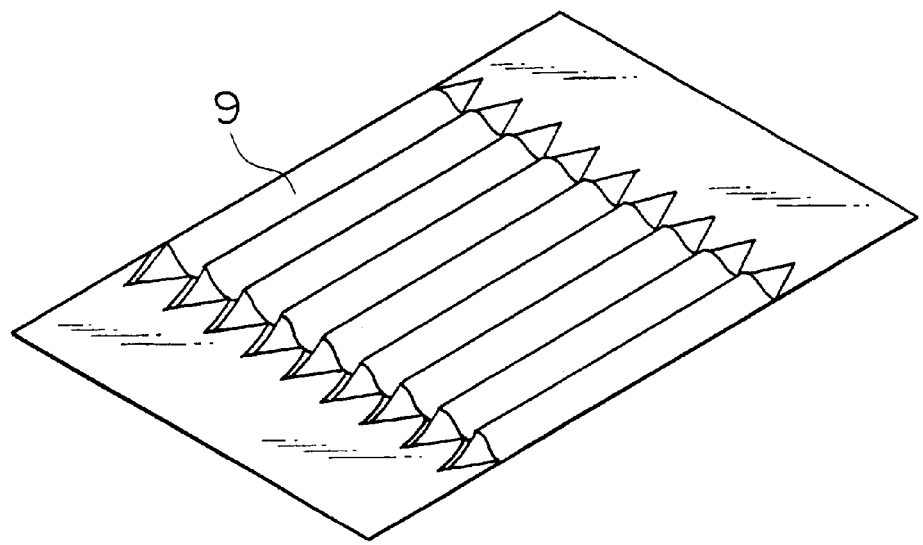
FIG. 10 is a perspective view showing the structure of the heat exchanging member of the opposed flow type total heat exchanger of the second embodiment of the present invention.
Figure 11:
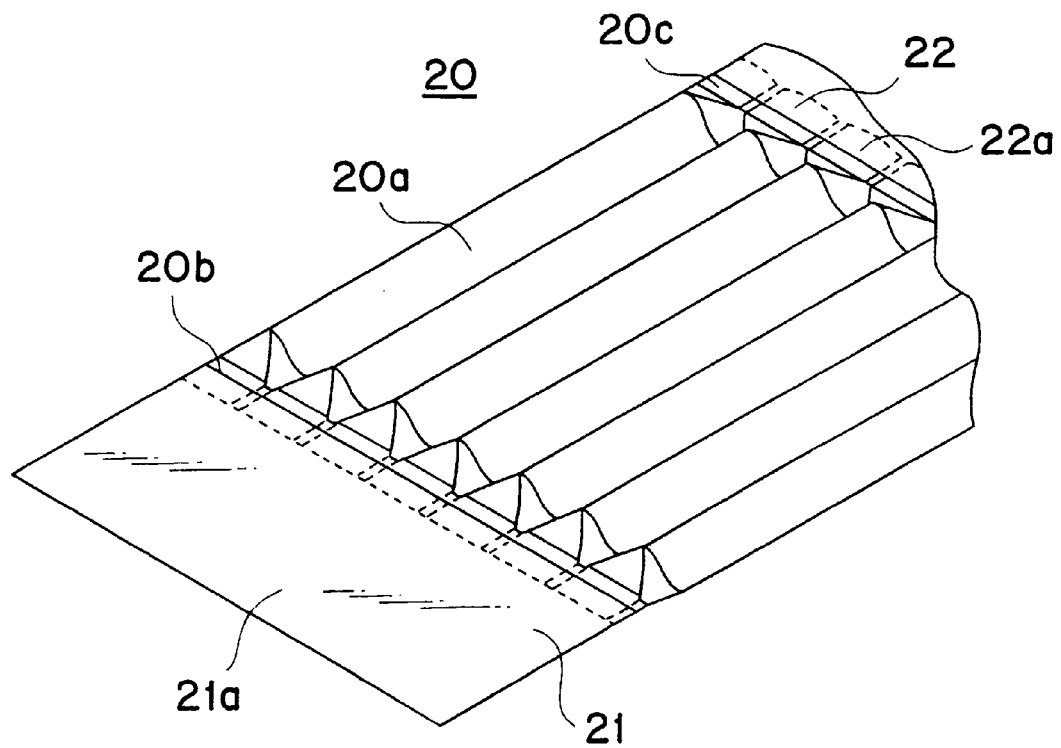
FIG. 11 is a perspective view showing the step of manufacturing the heat exchanging member shown in FIG. 10.
Figure 12:
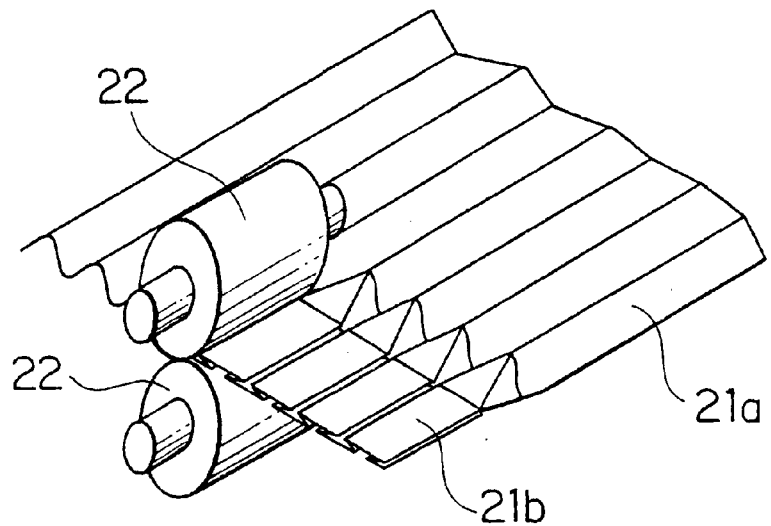
FIG. 12 is a perspective view showing the step different from that shown in FIG. 11 of manufacturing the heat exchanging member shown in FIG. 10.
Figure 13:
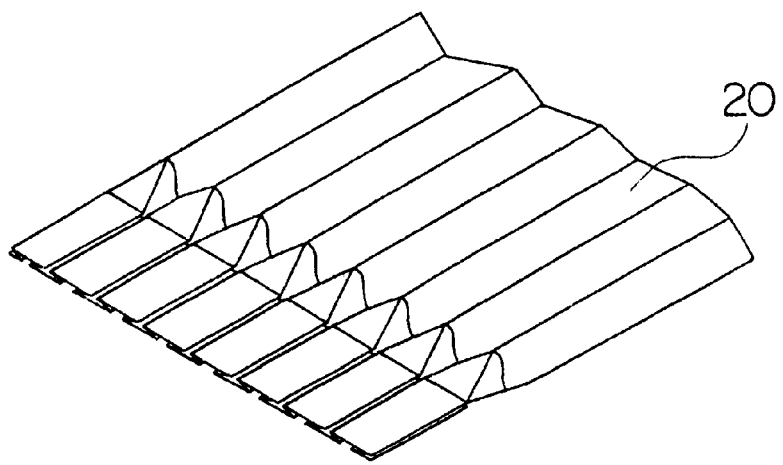
FIG. 13 is a perspective view showing the step different from that shown in FIG. 11 of manufacturing the heat exchanging member shown in FIG. 10.
Figure 14:
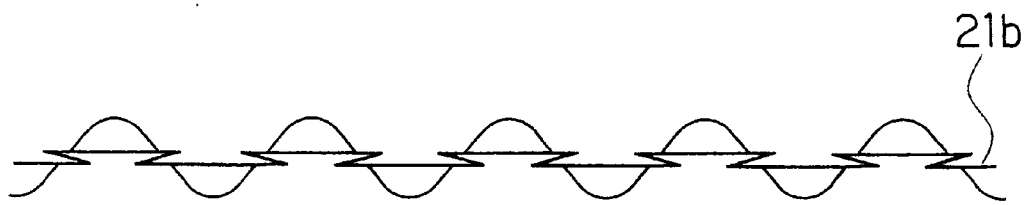
FIG. 14 is a sectional view diagrammatical showing the section taken along line XIV—XIV of FIG. 13.

FIG. 10 is a perspective view showing the structure of the heat exchanging member of the opposed flow type total heat exchanger of the second embodiment of the present invention, FIGS. 11 to 13 are perspective views showing the steps of manufacturing the heat exchanging member shown in FIG. 10, and FIG. 14 is a sectional view diagrammatical showing the section taken along line XIV—XIV of FIG. 13.

In the figures, 20 is a heat exchanging member made of a moisture permeable paper member 21 having formed thereon a widthwise corrugated portion 21a having a predetermined size and flat portions 21b and 21c which are header portions formed by pressing flat the longitudinally opposite ends by a predetermined length. The heat exchanging members 20 are stacked to a certain height to provide a heat exchanger as shown in FIG. 1 in the first embodiment.

Then, the method for manufacturing the heat exchanging member 20 of the opposed flow type total heat exchanger of the second embodiment will now be described in conjunction with FIGS. 11 to 13.

Figure 15:
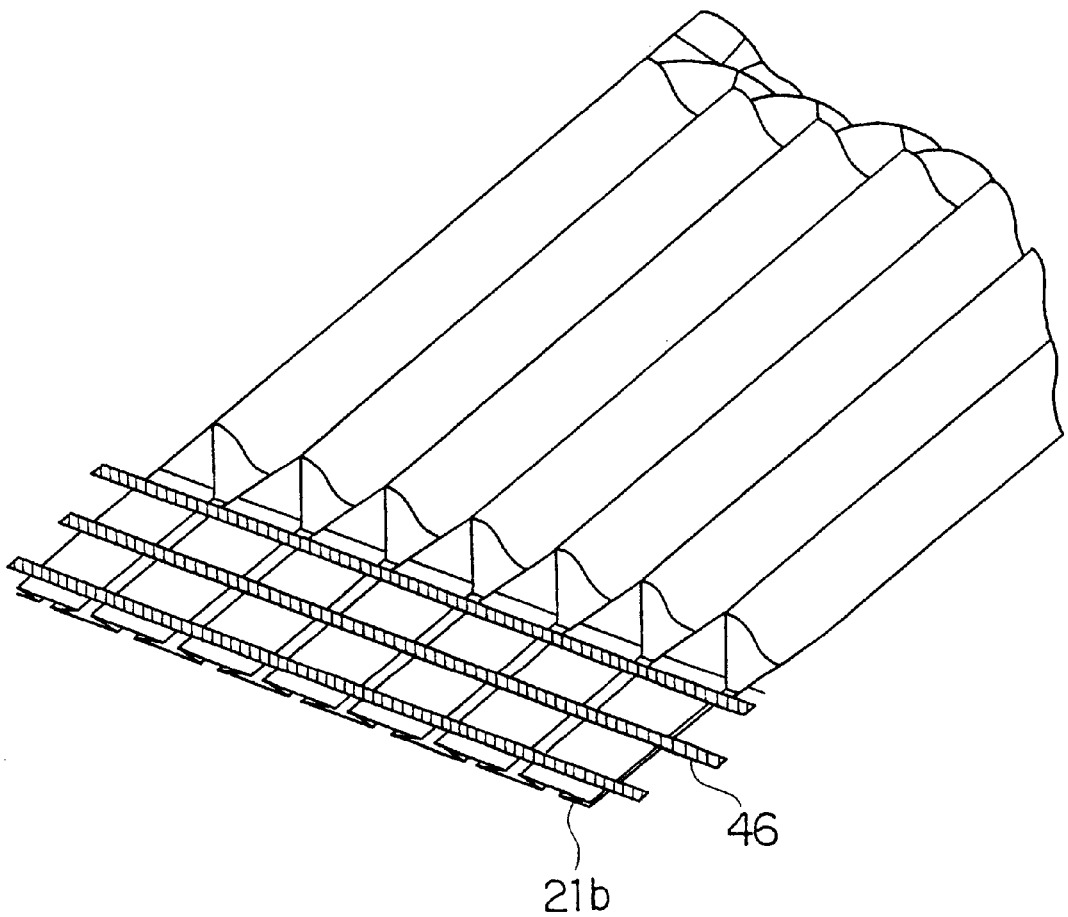
FIG. 15 is a perspective view showing the structure of the heat exchanging member of the opposed flow type total heat exchanger of the second embodiment of the present invention but a modification different from that shown in FIG. 10.

First, as shown in FIG. 11, the corrugated portion 21a having corrugations of a predetermined size in the direction of width of the paper member 21 having a permeability to moisture for defining the heat exchanging flow paths is formed. Then, as shown in FIG. 12, the corrugated portions 21a at the longitudinally opposite end portions of the paper member 21 are pressed and flattened by a predetermined dimension by rollers 22 to form-the flat portions 21b and 21c as shown in FIG. 13. It is preferable that the configuration of the folds due to the pressing is thin regular folds without overlapping as shown in FIG. 14 because they does not decrease the flow path cross sectional area and does not increase the pressure loss. Finally, a bonding agent such as Hot Melt resin as a shape maintaining member is applied to the flat portions 21b and 21c or a restriction belt such as a tape 46 as shown in FIG. 15 may be used to maintain the shape and the heat exchanging member 20 is obtained.

Thus, according to the second embodiment of the present invention, the heat exchanging member 20 is formed by forming the corrugated portion 21a having corrugations of a predetermined size in the direction of the width of the paper member 21 having a permeability to moisture for defining the heat exchanging flow paths is formed and the corrugated portions 21a at the longitudinally opposite end portions of the paper member 21 are pressed and flattened by a predetermined dimension to form the flat portions 21b and 21c as the header defining portions, so that the decrease of the number of the parts and the assembly can be made easy, thereby to improving the productivity.

Figure 16:
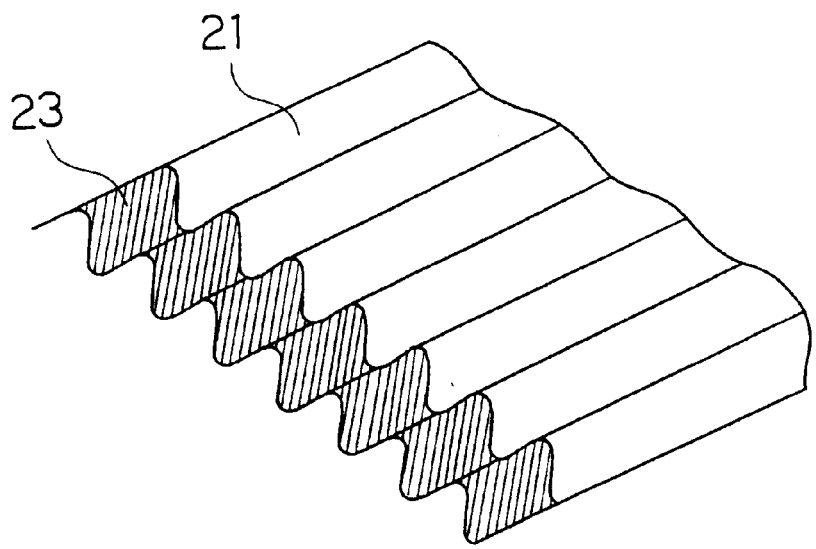
FIG. 16 is a perspective view showing the structure of the heat exchanging member of the opposed flow type total heat exchanger of the second embodiment of the present invention but a modification different from that shown in FIG. 10.

It is to be noted that while the description has been made in terms of using the shape maintaining member such as the tape 46 or the like for maintaining the shapes of the flat portions 21b and 21c in the above description of the structure, the arrangement for maintaining the shape may also be the bonding of the folded portions of the flat portions 21b and 21c formed by pressing and fattening the portion to which a bonding agent 23 having a heat weldability such as Hot melt, acetic acid or the like is applied and to which the flat portions 21b and 21c are to be formed as shown in FIG. 16. Also, as for the paper member 21, a heat weldable material, such as a paper in which heat weldable chemical fibers such as polyethylene or polyethylene terephtalate are completely or partly mixed into pulp fibers, or a sheet in which a base of pulp fibers is completely or partly coated with a heat weldable adhesive such as Hot Melt or acetic acid vinyl, may be used. In this case, a bonding agent or another shape maintaining means for maintaining the flattened shape is not necessary, so that the process for maintaining the shape or for applying a bonding agent may be eliminated, resulting in further improvements in productivity.

Further, when a paper containing chemical fibers is used as heat weldable paper, the chemical fibers melt due to the heat while the flat portions 21b and 21c are being formed and the density of the paper sheet itself increases to allow the thickness of the flat portions 21b and 21c to be small, so that the flow paths can relatively be expanded to decrease the flow resistance in the flow paths, resulting in a heat exchanger of a low pressure loss.

Further, although not discussed in detail in the above, while the heat exchanging members may or may not have the partition paper members interposed therebetween, at least one portion of the joint portion may be left free from the application of the bonding agent, so that, since the moisture passes much easier through the portion in which the heat exchanging member and the partition paper member directly contact each other than through the portion in which the bonding agent is interposed, allowing the provision of a heat exchanger of a higher efficiency in moisture exchange.

Figure 17:
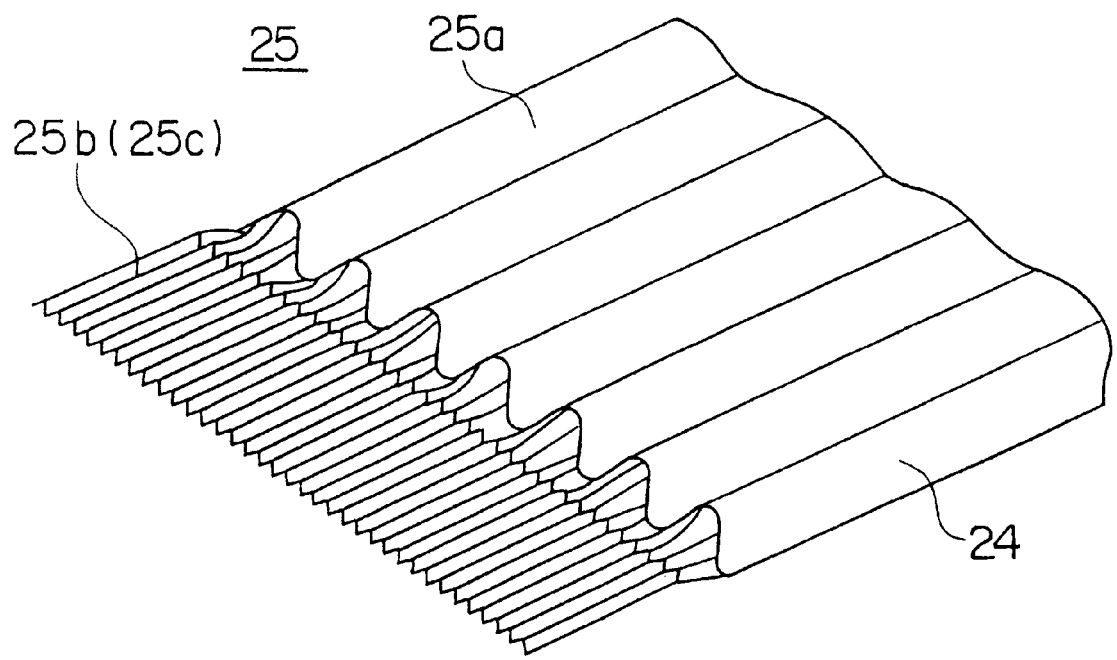
FIG. 17 is a perspective view showing the structure of the heat exchanging member of the opposed flow type total heat exchanger of the third embodiment of the present invention.
Figure 18:
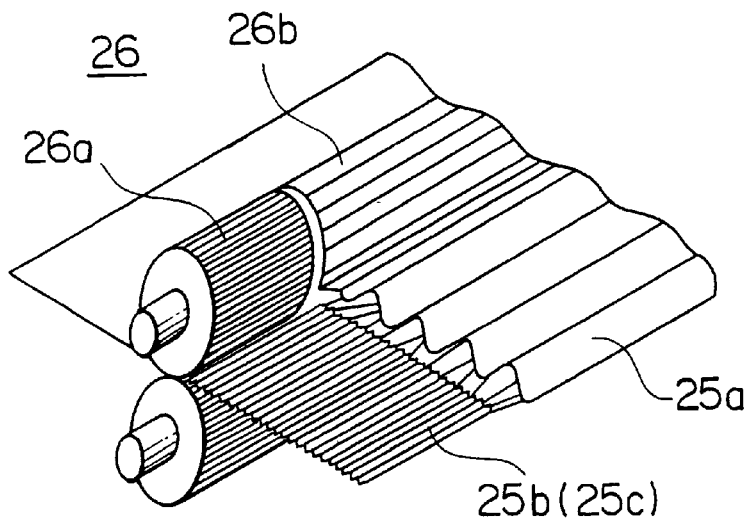
FIG. 18 is a perspective view showing the step of manufacturing the heat exchanging member of FIG. 17.
Figure 19:
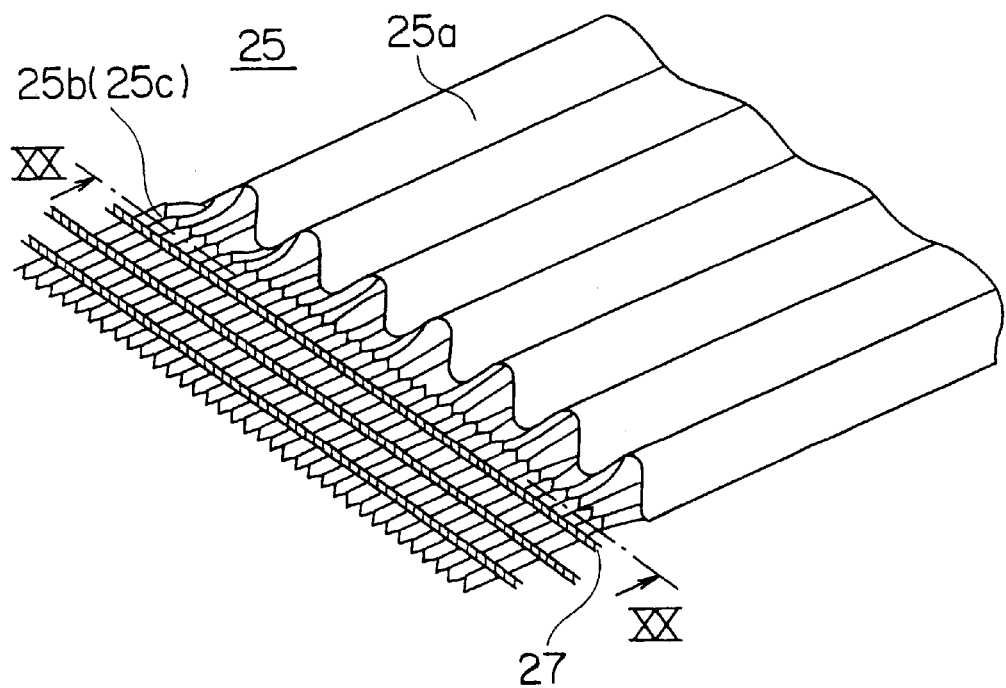
FIG. 19 is a perspective view showing the step of manufacture of the heat exchanging member of FIG. 17, but different from that of FIG. 18.
Figure 20:
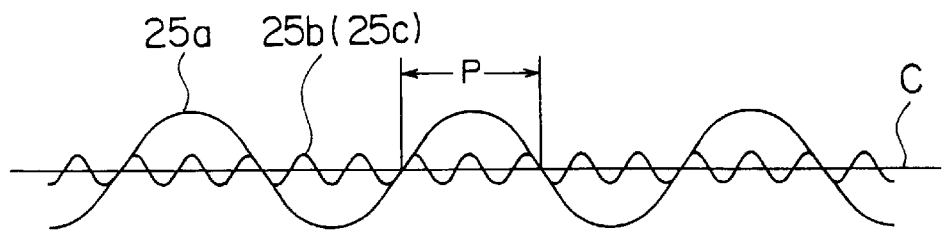
FIG. 20 is a sectional view diagrammatical showing the section taken along line XX—XX of FIG. 19.

FIG. 17 is a perspective view showing the structure of the heat exchanging member of the opposed flow type total heat exchanger of the third embodiment of the present invention, FIGS. 18 and 19 are perspective views showing the steps of manufacture of the heat exchanging member of FIG. 17, and FIG. 20 is a sectional view diagrammatical showing the section taken along line XX—XX of FIG. 19.

In the figures, 24 is a heat exchanging member made of a paper member 25 having a permeability to moisture and comprises a first corrugated portion 25a disposed in the central portion in the longitudinal direction and having corrugations of a predetermined size for defining heat exchanging flow paths in the width direction, and second corrugated portions 25b and 25c (only one of them is shown) formed simultaneously with the first corrugation portion 25a at the longitudinally opposite end portions for defining the header defining portion and having smaller corrugations.

Then, the method for manufacturing the heat exchanging member 24 of the opposed flow type total heat exchanger of this embodiment will now be described in conjunction with FIGS. 18 and 19.

First, as shown in FIG. 18, through the use of a corrugated portion forming means 26 such as a corrugate machine or rack and pinion in which corrugation wheels 26a and 26b of two different size, a first and a second corrugation portions 25b and 25c are simultaneously formed at the longitudinally central portion and the longitudinally opposite end portions of a paper member 25 having a permeability to moisture. Finally, a bonding agent such as Hot Melt resin as a shape maintaining member is applied to the second corrugated portions 25b and 25c or a restriction belt such as a tape 27 as shown in FIG. 19 may be used to maintain the shape and the heat exchanging member 24 is obtained.

Both corrugations of the first and second corrugated portions 25a, 25b and 25c thus formed may be made to have the same pitch P of the corrugations such as in the similar configuration, thereby the formation of both of the corrugations of different size can be achieved without the need for the plastic deformation. Also, the smaller the corrugations of the second corrugated portions 25b and 25c the lesser the pressure loss at the header portions and the center lines of both of the corrugations are preferably brought into coincidence with each other as shown by the line C in FIG. 20.

Thus, according to the third embodiment, the first corrugated portion 25a having the corrugations of a predetermined dimension for defining heat exchanging flow paths, and the second corrugated portions 25b and 25c having a corrugations smaller than the corrugations of the first corrugated portion 25a for defining the header defining portion at the longitudinally opposite end portions are arranged to be simultaneously formed, so that the step of pressing to form the flat portions in the forgoing first and second embodiments can be eliminated, thereby allowing the further improvements in the productivity.

Figure 21:
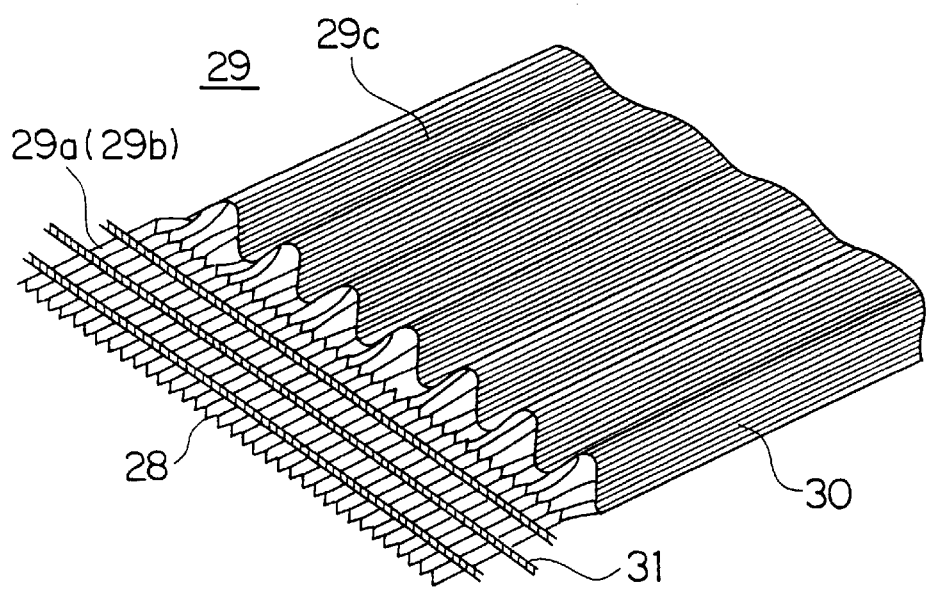
FIG. 21 is a perspective view showing the structure of the heat exchanging member of the opposed flow type total heat exchanger of the fourth embodiment of the present invention.

FIG. 21 is a perspective view showing the structure of the heat exchanging member of the opposed flow type total heat exchanger of the fourth embodiment of the present invention.

In the figure, 28 is a heat exchanging member made of a paper member 29 having a permeability to moisture having formed in the longitudinally opposite end portions a first corrugated portions 29a and 29b having a small corrugations for defining a header defining portion, and having formed in the central portion less the region in which the corrugated portions 29a and 29b are formed a second corrugated portion 29c having corrugations of a predetermined size larger than the corrugation of the first corrugated portions for defining a heat exchanging flow paths and having in its surface fine wrinkles 30.

Then, the method for manufacturing the heat exchanging member 24 of the opposed flow type total heat exchanger of this embodiment will now be described in conjunction with FIG. 21.

First, through the use of a corrugate machine or rack and pinion, small corrugations in the widthwise direction are formed over the entire area of a paper member 29 having a permeability to moisture. Then, except for the longitudinally opposite end portions, a second corrugated portion 29c having corrugations of a predetermined larger than the first corrugations for defining the heat exchanging flow paths is formed at the central portion of the corrugated paper member. At this time, the first corrugated portions 29a and 29b are formed in the regions of the longitudinally opposite end portions and fine wrinkles which are marks of the small corrugations appear on the surface of the second corrugated portion 29c. Finally, a bonding agent such as Hot Melt resin as a shape maintaining member is applied to the second corrugated portions 29a and 29b or a restriction belt such as a tape 31 as shown in the figure may be used to maintain the shape and the heat exchanging member 28 is obtained.

Thus, according to the above fourth embodiment, the small corrugations in the widthwise direction are formed over the entire area of a paper member 29 and except for the longitudinally opposite end portions, a second corrugated portion 29c having corrugations of a predetermined size larger than the first corrugations for defining the heat exchanging flow paths is formed at the central portion of the corrugated paper member and the first corrugated portions 29a and 29b are formed in the regions of the longitudinally opposite end portions, so that the step of pressing to form the flat portions can be eliminated as in the above third embodiment thereby allowing the further improvements in the productivity and also the fine wrinkles 30 formed in the second corrugated portion 29c increase the heat conduction area, thereby allowing the increase in the heat exchange efficiency.

FIGS. 22 to 27 are sectional views showing the modified examples of the seal structure of the end portions of the header portion of the opposed flow type total heat exchanger of the fifth embodiment of the present invention.

The sealing structures of the end portions of the header portion will now be described in conjunction with the drawings.

Figure 22:
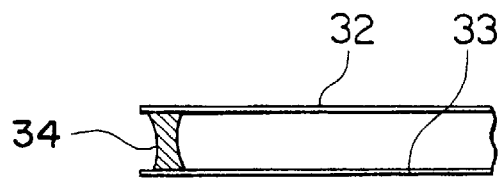
FIG. 22 is a sectional view showing the seal structure of the end portion of the header portion of the opposed flow type total heat exchanger of the fifth embodiment of the present invention.

FIG. 22 shows a structure, in which a thermoplastic material such as Hot Melt in a molten state is applied between the header defining portions 32 and 33 to join them with a predetermined clearance therebetween when hardened and in which a seal member 34 is formed between end portions of neighboring header defining portions 32 and 33. According to this structure, an inexpensive thermoplastic material may be used as the sealing member 34 and the header defining portions 32 and 33 are joined by the self adhesion at the time of hardening, so that no bonding agent is necessary, allowing the decrease of cost and the increase in the productivity.

Figure 23:
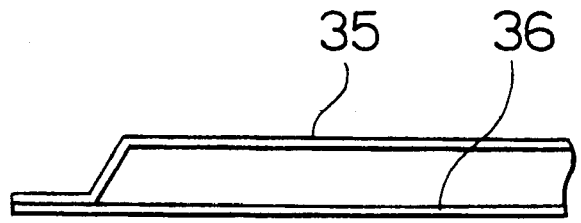
FIG. 23 is a sectional view showing a modified example different from that of FIG. 22 of the seal structure of the end portion of the header portion of the opposed flow type total heat exchanger of the fifth embodiment of the present invention.
Figure 24:
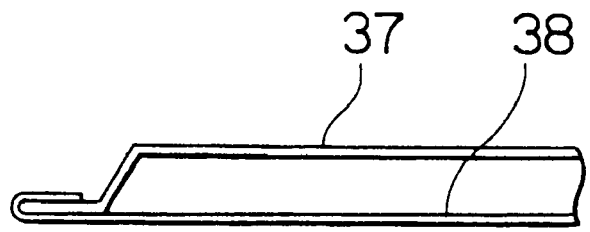
FIG. 24 is a sectional view showing a modified example different from the foregoing figures of the seal structure of the end portion of the header portion of the opposed flow type total heat exchanger of the fifth embodiment of the present invention.
Figure 25:
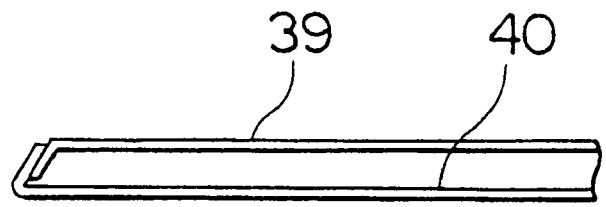
FIG. 25 is a sectional view showing a modified example different from the foregoing figures of the seal structure of the end portion of the header portion of the opposed flow type total heat exchanger of the fifth embodiment of the present invention.

Also, FIGS. 23, 24 and 25 are structures in which at least one of the neighboring header defining portions is folded onto the other end portion and bonded thereto by a bonding agent or the like. In FIG. 23, the end portion of one of the header defining portions 35 is folded or bent as shown to be placed over and joined to the end portion of the other header defining portion 36. In FIG. 24, the end portion of one of the header defining portions 37 is folded or bent as shown and this bent portion is wrapped by the end portion of the other header defining portion 38 and joined. In FIG. 25, the end portions of each of the header defining portions 39 and 40 is bent to tilt as shown to be placed over and joined to each other. According to these structure, there is no need for any member for sealing except for the bonding agent, so that the cost reduction and improvements in productivity can be achieved. Also, when the header defining portion that has a heat weldability is utilized, a bonding agent is not necessary, allowing a further decrease in the manufacturing cost.

Figure 26:
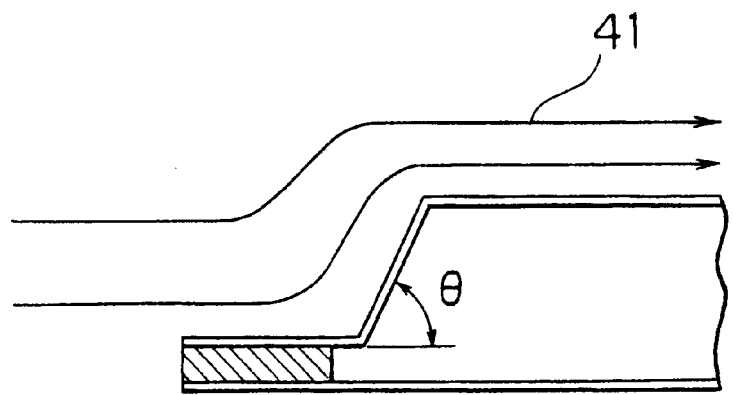
FIG. 26 is a sectional view showing a modified example different from the foregoing figures of the seal structure of the end portion of the header portion of the opposed flow type total heat exchanger of the fifth embodiment of the present invention.
Figure 27:
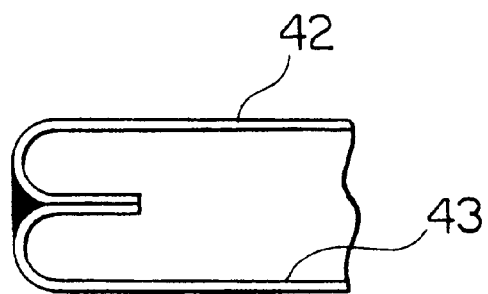
FIG. 27 is a sectional view showing a modified example different from the foregoing figures of the seal structure of the end portion of the header portion of the opposed flow type total heat exchanger of the fifth embodiment of the present invention.

Further, when the bent angle θ of the end portion is at a predetermined value equal to or less than 90 degrees as shown in FIG. 26, the flow 41 of the fluid becomes smooth whereby the pressure loss at the flow entrance can be reduced. It is to be noted that, while the end portions of the header defining portion are different from one another in the structures shown in FIGS. 23 to 25, the end portions of the header defining portions 42 and 43 may be symmetrically bent or folded as shown in FIG. 27, making the bending step easier because the end portions have identical configuration, allowing a further improvement in the productivity.

Figure 28:
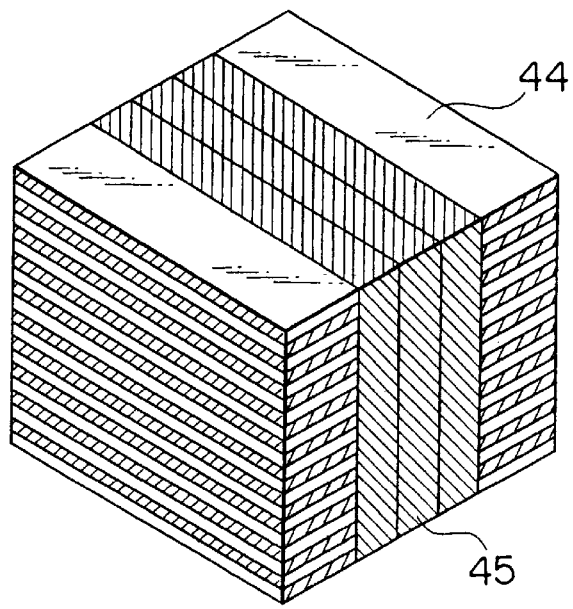
FIG. 28 is a perspective view showing a schematic structure of the opposed flow type total heat exchanger of the sixth embodiment of the present invention.
Figure 29:
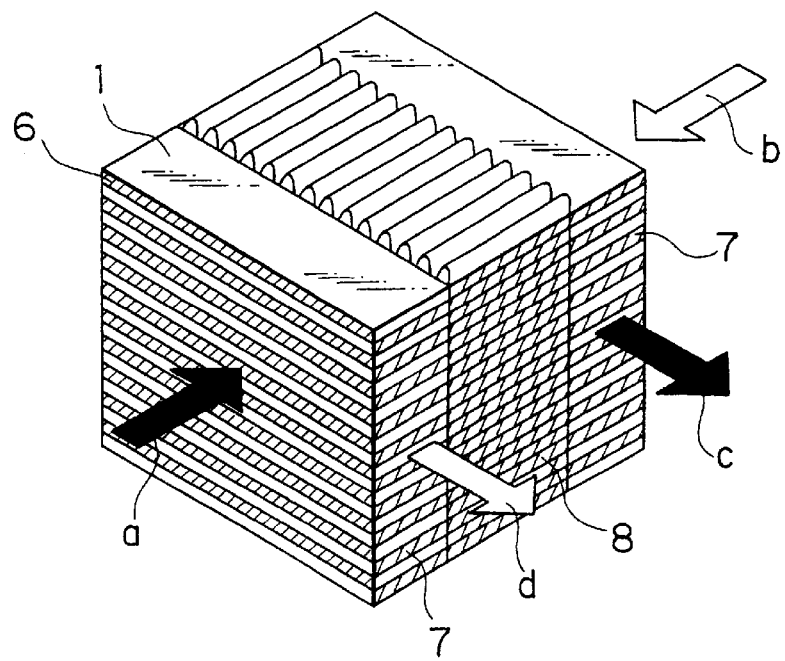
FIG. 29 is a perspective view illustrating a general structure of a conventional opposed flow type total heat changer.
Figure 30:
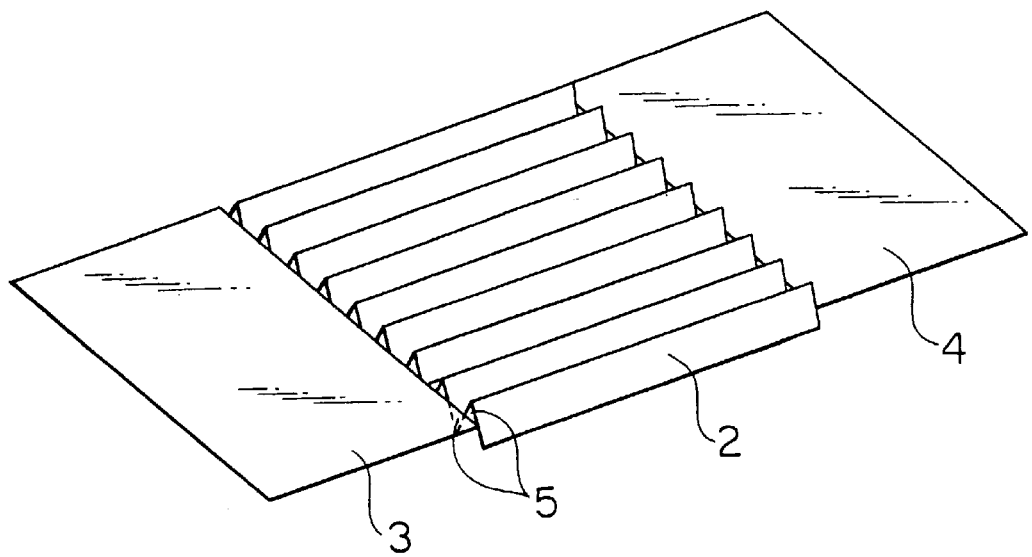
FIG. 30 is a perspective view showing the structure of a heat exchanging member constituting a main portion of the opposed flow type total heat exchanger shown in FIG. 29.
Figure 31:
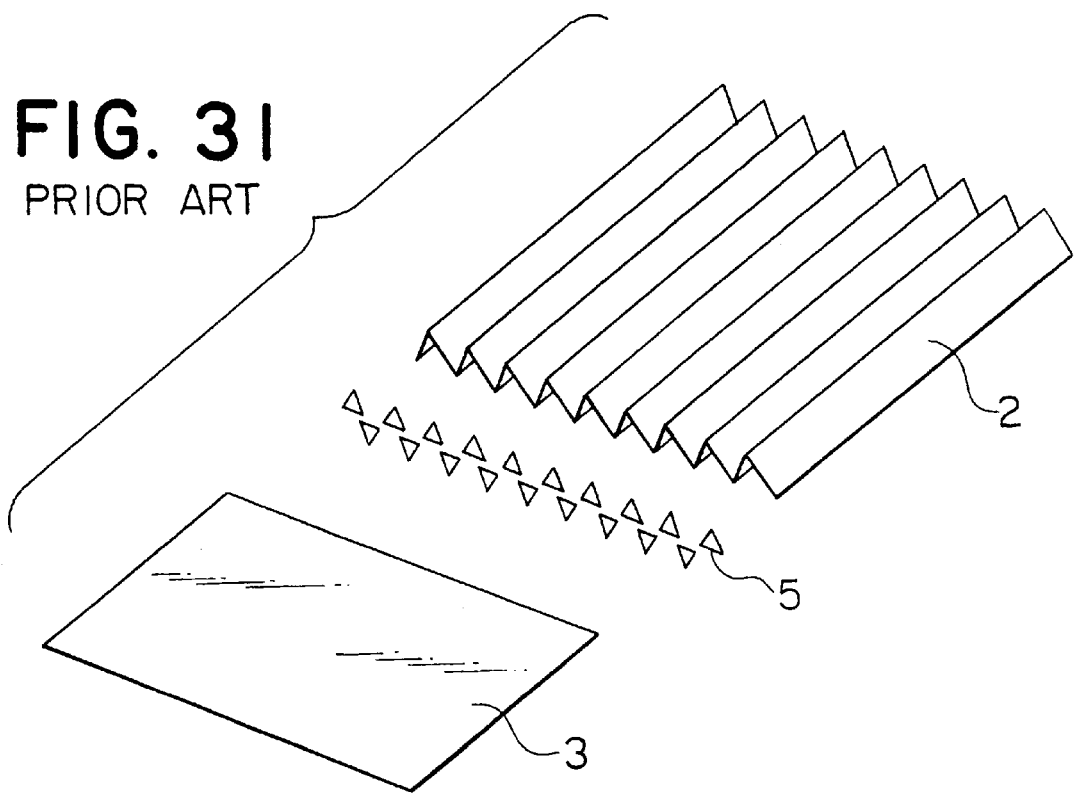
FIG. 31 is an expanded perspective view showing the heat exchanging member shown in FIG. 30.
Figure 32:
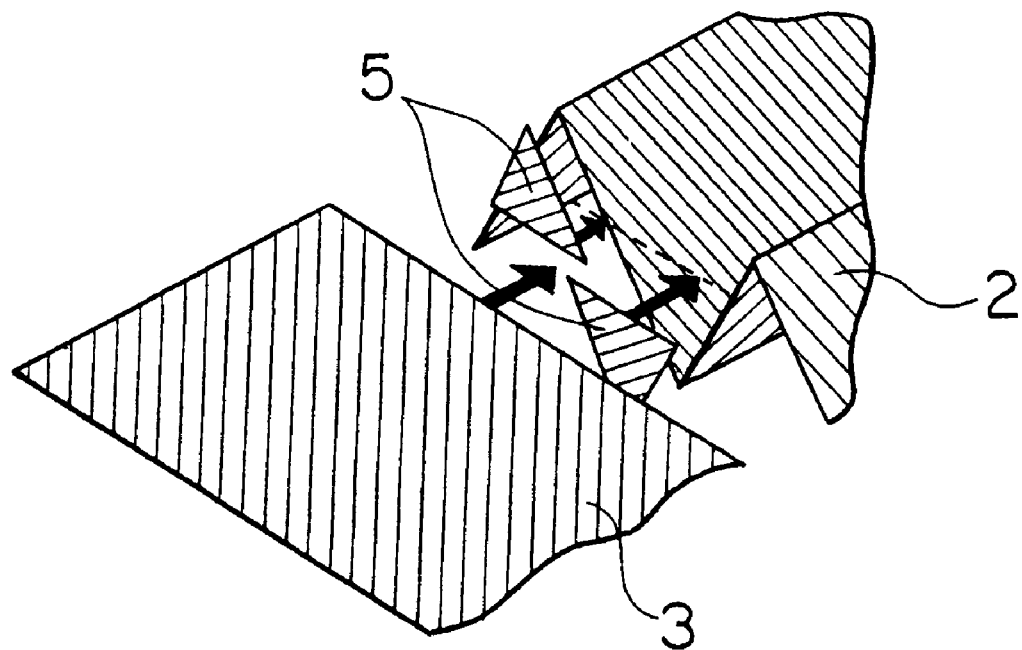
FIG. 32 is a perspective view showing the procedures for assembling a joint portion between the opposed flow portion and the header portion of the heat exchanging member shown in FIG. 30.

While the seal structure of the end portions of the header portion is described in the above third embodiment, an adhesive tape 45 may be attached around the circumference of the opposed flow portion of each heat exchanging member 44 stacked as shown in FIG. 28 to constituting the heat exchanger. According to this structure, a less expensive and easier seal can be provided as compared to the seal structure in which side face of each layer is sealed by the sealing member as described in conjunction with the first embodiment shown in FIG. 1, the manufacturing cost can be decreased and the productivity can be improved.

As has been described, according to one embodiment of the present invention, an alternating flow of supply air and exhaust air are supplied in opposite directions between a plurality of stacked heat exchanging members and is characterized in that the heat exchanging members each is composed of a first paper member having a moisture permeability and corrugated in the width direction and having flat portions at the longitudinally opposite ends flattened under pressure, and a pair of second paper members having one end joined to the flat portions and the other end side extending flatly in the longitudinal direction to define a header defining portion for defining a header portion, so that the number of the parts can be decreased and the assembly can be made easier, whereby a heat exchanger with an improved productivity can be provided.

According to another embodiment of the heat exchanger of the present invention, an alternating flow of supply air and exhaust air are supplied in opposite directions between a plurality of stacked heat exchanging members and is characterized in that the heat exchanging members each is composed of a first paper member having a moisture permeability and corrugated in the width direction and having flat portions at the longitudinally opposite ends flattened under pressure, and a pair of second paper members having one end joined to the flat portions and the other end side extending flatly in the longitudinal direction to define a header defining portion for defining a header portion, and that a flat plate-like partitioning paper member is interposed between the heat exchanging members, so that the number of the parts can be decreased and the assembly can be made easier, whereby a heat exchanger with an improved productivity can be provided.

According to another embodiment of the heat exchanger of the present invention, the second paper members has thermal adhesion property, so that a heat exchanger with an improved productivity can be provided.

According to another embodiment of the heat exchanger of the present invention, an alternating flow of supply air and exhaust air are supplied in opposite directions between a plurality of stacked heat exchanging members, and is characterized in that the heat exchanging members each is composed of a paper member having a moisture permeability and corrugated in the width direction and a header defining portion for defining a header portion by a flattened portions at the longitudinally opposite ends flattened under pressure over a predetermined length, so that the number of the parts can be decreased and the assembly can be made easier, whereby a heat exchanger with an improved productivity can be provided.

According to another embodiment of the heat exchanger of the present invention, an alternating flow of supply air and exhaust air are supplied in opposite directions between a plurality of stacked heat exchanging members, and is characterized in that the heat exchanging members each is composed of a paper member having a moisture permeability and corrugated in the width direction and a header defining portion for defining a header portion by a flattened portions at the longitudinally opposite ends flattened under pressure over a predetermined length and that a flat plate-like partitioning paper member is interposed between the heat exchanging members, so that the number of the parts can be decreased and the assembly can be made easier, whereby a heat exchanger with an improved productivity can be provided.

According to another embodiment of the heat exchanger of the present invention, the header defining portion is held by a shape holding member, so that a heat exchanger with an improved productivity can be provided.

According to another embodiment of the heat exchanger of the present invention, the paper members has thermal bonding property, so that a heat exchanger with an improved productivity can be provided.

According to another embodiment of the heat exchanger of the present invention, the paper containing chemical fibers is used, so that a heat exchanger with an improved productivity and a low pressure loss can be provided.

According to another embodiment of the heat exchanger of the present invention, the header portion is formed by sealing the end portions of neighboring header defining portions by a thermoplastic material with a predetermined clearance held therebetween, so that a heat exchanger with an improved productivity can be provided.

According to another embodiment of the heat exchanger of the present invention, the header portion is formed by folding at least one of the end portions of neighboring header defining portions and stacking over the other end portion to seal therebetween, so that a heat exchanger with an improved productivity can be provided.

According to another embodiment of the heat exchanger of the present invention, the end portion of the header defining portion is folded such that it is sloped along the direction of flows of intake air and exhaust air, so that a heat exchanger with an improved productivity and a low pressure loss can be provided.

According to another embodiment of the heat exchanger of the present invention of, the contacting portion of the opposite flow portion of the heat exchanging member and the partition paper member is joined together except for one portion, so that a heat exchanger with an improved productivity and a high moisture exchange efficiency can be provided.

According to another embodiment of the heat exchanger of the present invention, the circumference of the opposite flow portion of the stacked heat exchanging members is wound with an adhesive tape, so that a heat exchanger with an improved productivity can be provided.

According to another embodiment of the method for manufacturing a heat exchanger, the method comprises the steps of forming widthwise corrugations in a first paper member having a moisture permeability, overlapping end portions of a pair of flat plate like second paper members on a longitudinally opposite ends of the first paper member, and pressing the overlapped end portions of the first and second paper members together to join the end portions of the paper members together and to flatten the pressed portions to define a header defining portion, so that a method for manufacturing a heat exchanging member of a heat exchanger with an improved productivity can be provided.

According to another embodiment of the method for manufacturing a heat exchanger, the method comprises steps of forming widthwise corrugations in a paper member having a moisture permeability, and pressing a longitudinally opposite end portions of the paper members together to flatten a predetermined region to define a header defining portion, so that a method for manufacturing a heat exchanging member of a heat exchanger with an improved productivity can be provided.

According to another embodiment of the method for manufacturing a heat exchanger, the method comprises the steps of simultaneously forming a first corrugated portion having widthwise corrugations of a predetermined size for heat exchanging flow paths in a longitudinally central portion of a paper member having a moisture permeability and a second corrugated portion having widthwise corrugations smaller than the first corrugated portion in a longitudinally opposite end portions of the paper member, so that a method for manufacturing a heat exchanging member of a heat exchanger with an improved productivity can be provided.

According to another embodiment of the method for manufacturing a heat exchanger, the method comprises the steps of forming a first corrugated portion having widthwise small corrugations in a paper member having a moisture permeability, and forming a second corrugated portion for heat exchanging flow paths and having a predetermined size larger than the first corrugated portion, so that a method for manufacturing a heat exchanging member of a heat exchanger with an improved productivity and a high heat exchanging efficiency can be provided.

What is claimed is:

1. A heat exchanger in which an alternate flow of supply air and exhaust air are supplied in opposite directions between a plurality of stacked heat exchanging members, each of said heat exchanging members comprising a paper member having a moisture permeability, said paper members comprising a corrugated portion which is corrugated in the width direction and header defining portions for defining header portions including flattened, continuous predetermined length portions of the corrugated portion at each of the longitudinally opposite ends of the corrugated portion formed under pressure.

2. A heat exchanger as claimed in claim 1, further comprising a flat plate-like partitioning paper member interposed between said heat exchanging members.

3. A heat exchanger as claimed in claim 1, wherein said header defining portions held by a shape holding member.

4. A heat exchanger as claimed in claim 1, wherein said paper members have a thermal bonding property.

5. A heat exchanger as claimed in claim 1, wherein the contacting portion of the opposite flow portion of the heat exchanging member and the partition paper member is joined together except for one portion.

6. A heat exchanger as claimed in claim 1, wherein said paper members comprise said first paper member further comprising flat portions at the longitudinally opposite ends of said corrugated portion flattened under pressure, and a pair of second paper members having one end joined to said flat portions and the other end extending flatly in the longitudinal direction to define said header defining portions for defining a header portions.

7. A heat exchanger as claimed in claim 6, further comprising a flat plate-like partitioning paper member interposed between said heat exchanging members.

8. A heat exchanger as claimed in claim 6, wherein said second paper members have a thermal bonding property.

9. A heat exchanger as claimed in claim 8, wherein a paper containing chemical fibers is used.

10. A heat exchanger as claimed in claim 6, wherein circumference of the opposite flow portion of the stacked heat exchanging members is wound with an adhesive tape.

11. A heat exchanger as claimed in claim 6, wherein said header portions are formed by sealing the end portions of neighboring header defining portions by a thermoplastic material with a predetermined clearance held therebetween.

12. A heat exchanger as claimed in claim 6, wherein said header portions are formed by folding at least one of the end portions of neighboring header defining portions and stacking over the other end portion to seal therebetween.

13. A heat exchanger as claimed in claim 12, wherein the end portion of each of the header defining portions is folded such that it is sloped along the direction of flows of intake air and exhaust air.

14. A heat exchanger in which an alternate flow of supply air and exhaust air are supplied in opposite directions between a plurality of stacked heat exchanging members, each of said heat exchanging members comprising a first paper member having moisture permeability and corrugated in the width direction and comprising flattened, continuous portions extending outwardly in the longitudinal direction from said corrugated portion at the longitudinally opposite ends of said corrugated portion formed under pressure, and a pair of second paper members having one end joined to said flat portions and the other end extending flatly in the longitudinal direction to define header defining portions for defining header portions.

15. A heat exchanger as claimed in claim 1, wherein the corrugations have edges which define a continuous surface in a direction transverse to the corrugations.

* * * * *

UNITED STATES PATENT AND TRADEMARK OFFICE
CERTIFICATE OF CORRECTION

PATENT NO. : 6,032,730  Page 1 of 1
APPLICATION NO. : 08/925465
DATED : March 7, 2000
INVENTOR(S) : Akita et al.

It is certified that error appears in the above-identified patent and that said Letters Patent is hereby corrected as shown below:

On the title page item [22], should read:

-- Sep. 9, 1997 --

Signed and Sealed this

Seventeenth Day of April, 2007

JON W. DUDAS
*Director of the United States Patent and Trademark Office*